US012626191B2

(12) United States Patent
Zhao et al.

(10) Patent No.: US 12,626,191 B2
(45) Date of Patent: May 12, 2026

(54) KNOWLEDGE GRAPH FUSION METHOD BASED ON ITERATIVE COMPLETION

(71) Applicant: National University of Defense Technology, Changsha (CN)

(72) Inventors: Xiang Zhao, Changsha (CN); Weixin Zeng, Changsha (CN); Jiuyang Tang, Changsha (CN); Hongbin Huang, Changsha (CN); Jibing Wu, Changsha (CN); Deke Guo, Changsha (CN); Lailong Luo, Changsha (CN)

(73) Assignee: National University of Defense Technology, Changsha (CN)

( * ) Notice: Subject to any disclaimer, the term of this patent is extended or adjusted under 35 U.S.C. 154(b) by 673 days.

(21) Appl. No.: 18/097,292

(22) Filed: Jan. 16, 2023

(65) Prior Publication Data

US 2023/0206127 A1      Jun. 29, 2023

Related U.S. Application Data

(63) Continuation of application No. PCT/CN2020/102683, filed on Jul. 17, 2020.

(51) Int. Cl.
*G06N 5/022*        (2023.01)
*G06N 20/00*        (2019.01)

(52) U.S. Cl.
CPC .............. *G06N 20/00* (2019.01); *G06N 5/022* (2013.01)

(58) Field of Classification Search
CPC ........ G06N 20/00; G06N 5/022; G06N 3/042; G06N 3/044; G06N 3/045; G06N 3/08; G06F 16/28; G06F 16/36
See application file for complete search history.

(56) References Cited

U.S. PATENT DOCUMENTS

| | | | | |
|---|---|---|---|---|
| 11,372,940 B2 * | 6/2022 | Ramanath | ........... | G06F 16/9536 |
| 2008/0183653 A1 * | 7/2008 | Byrnes | ..................... | G06N 5/02 |
| | | | | 706/50 |

(Continued)

FOREIGN PATENT DOCUMENTS

| | | | | |
|---|---|---|---|---|
| CN | 109829057 | * | 5/2019 | ............. G06N 3/08 |
| CN | 111291139 | * | 6/2020 | ............. G06F 16/28 |

OTHER PUBLICATIONS

Lingbing Guo, Zequn Sun, and Wei Hu, 2019, Learning to Exploit Long-term Relational Dependencies in Knowledge Graphs, In Proceedings of the 36-th International Conference on Ma Chinese Learning, ICML 2019, Jun. 9-15, 2019, Long Beach, California, USA. 2505-2514.

*Primary Examiner* — Phenuel S Salomon
(74) *Attorney, Agent, or Firm* — Hemisphere Law, PLLC

(57)        ABSTRACT

Provided is a knowledge graph fusion method based on iterative completion, which includes: obtaining multiple knowledge graphs, and identifying each of entities of the multiple knowledge graphs; performing structure vector representation learning on each of entities to obtain a structure vector of each of entities, and performing entity name vector representation learning on each of entities to obtain an entity name vector of each of entities; determining a structural similarity between the entities according to the structure vector of each of entities, and determining an entity name similarity between the entities according to the entity name vector of each of entities; constructing a degree-aware-based co-attention network, and calculating an entity similarity between fused entities through the degree-aware-based co-attention network; and obtaining a high-confidence entity pair according to the entity similarity between the fused entities, and performing knowledge graph completion by iterative training to obtain fused knowledge graphs.

7 Claims, 2 Drawing Sheets

(56)                    References Cited

U.S. PATENT DOCUMENTS

2011/0258193 A1*  10/2011  Brdiczka ............... G06F 40/216
                                                   707/E17.046
2017/0228435 A1*   8/2017  Tacchi ................ G06F 16/9024

* cited by examiner

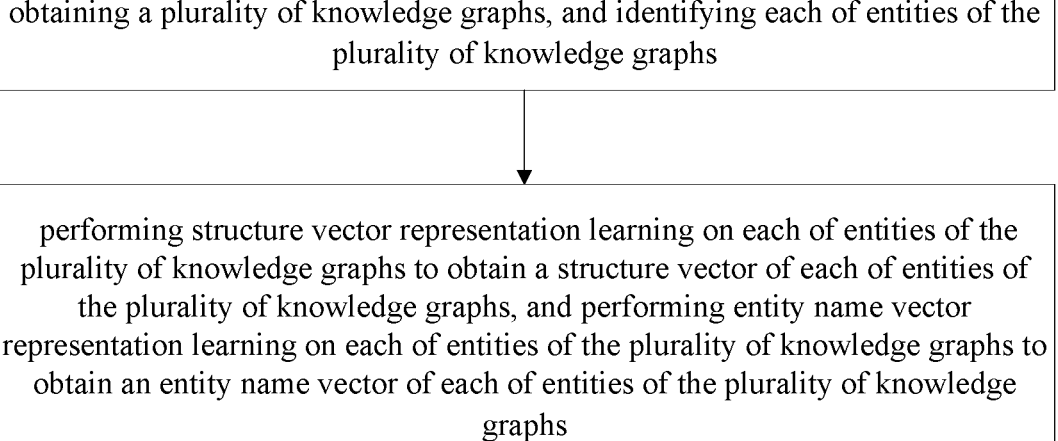

obtaining a plurality of knowledge graphs, and identifying each of entities of the plurality of knowledge graphs performing structure vector representation learning on each of entities of the plurality of knowledge graphs to obtain a structure vector of each of entities of the plurality of knowledge graphs, and performing entity name vector representation learning on each of entities of the plurality of knowledge graphs to obtain an entity name vector of each of entities of the plurality of knowledge graphs determining a structural similarity between the entities of the plurality of knowledge graphs according to the structure vector of each of entities of the plurality of knowledge graphs, and determining an entity name similarity between the entities of the plurality of knowledge graphs according to the entity name vector of each of entities of the plurality of knowledge graphs constructing a degree-aware-based co-attention network, and calculating an entity similarity between fused entities through the degree-aware-based co-attention network obtaining a high-confidence entity pair according to the entity similarity between the fused entities, and performing knowledge graph completion by iterative training to obtain fused knowledge graphs

FIG. 1

KNOWLEDGE GRAPH FUSION METHOD BASED ON ITERATIVE COMPLETION

TECHNICAL FIELD

The present disclosure relates to the technical field of natural language processing, and to generation and fusion of a knowledge graph, in particularly to a knowledge graph fusion method based on iterative completion.

DESCRIPTION OF RELATED ART

Over recent years, a large number of knowledge graphs (KGs) have emerged, such as YAGO, DBpedia, and Knowledge Vault. These large-scale knowledge graphs play an important role in intelligent services such as a question answering system and personalized recommendation. In addition, in order to meet the requirements of specific fields, more and more domain-specific knowledge graphs, such as academic knowledge graphs, are derived. However, no knowledge graph can be complete or completely correct.

In order to improve the coverage and accuracy of a knowledge graph, a feasible method is introducing relevant knowledge from other knowledge graphs, the reason is that there is redundancy and complementarity of knowledge among knowledge graphs constructed in different ways. For example, a general-purpose knowledge graph extracted and constructed from web pages may only contain names of scientists, while more information can be found in academic knowledge graphs constructed based on academic data. In order to integrate knowledge of external knowledge graphs into a target knowledge graph, the most important step is to align different knowledge graphs. Therefore, a task of entity alignment (EA) has been put forward and received wide attention. This task aims to find entity pairs that express a same meaning in different knowledge graphs. These entity pairs serve as bonds for linking the different knowledge graphs, and serve the consequent tasks.

At present, mainstream entity alignment methods mainly determine whether two entities point to a same thing by means of structural features of the knowledge graph. These methods assume that entities expressing a same meaning in different knowledge graphs have similar adjacency information. An entity generation structure vector proposed by Lingbing Guo et al., which brought a certain effect on the recognition of entity pairs (referring to the reference document Lingbing Guo, Zequn Sun, and Wei Hu, 2019, Learning to Exploit Long-term Relational Dependencies in Knowledge Graphs, In Proceedings of the 36th International Conference on Ma Chinese Learning, ICML 2019, 9-15 Jun. 2019, Long Beach, California, USA. 2505-2514). Further, these methods have achieved the best experimental results on artificially constructed data sets. However, a recent work pointed out that knowledge graphs in these artificially constructed data sets are denser than those in the real world, and thus the effect of the entity alignment method based on the structural features on the knowledge graphs with normal distribution is greatly reduced.

In fact, by analyzing the distribution of entities of the knowledge graphs in the real world, it can be known that more than half of the entities are each connected to only one or two other entities. These entities are called long-tail entities, which occupy most of the entities of the knowledge graphs, making the knowledge graphs show high sparseness as a whole, which is also in line with the knowledge graphs in the real world: only a few entities are frequently used and have rich adjacency information; and most entities are rarely mentioned and contain little structure information. Therefore, current entity alignment methods and knowledge graph fusion methods based on structure information are unsatisfactory in data sets in the real world.

SUMMARY

In view of this, the objective of the present disclosure is to propose a knowledge graph fusion method based on iterative completion. The method overcomes the shortcomings of the related art, and is used to identify and align identical or similar entities from multiple knowledge graphs, so as to realize knowledge fusion of multiple knowledge graphs and improve the coverage and accuracy of knowledge graphs.

Based on the above objective, a knowledge graph fusion method based on iterative completion is provided, which includes:

step 1, obtaining multiple knowledge graphs, and identifying each of entities of the multiple knowledge graphs;

step 2, performing structure vector representation learning on each of entities of the multiple knowledge graphs to obtain a structure vector of each of entities of the multiple knowledge graphs, and performing entity name vector representation learning on each of entities of the multiple knowledge graphs to obtain an entity name vector of each of entities of the multiple knowledge graphs;

step 3, determining a structural similarity between the entities of the multiple knowledge graphs according to the structure vector of each of entities of the multiple knowledge graphs, and determining an entity name similarity between the entities of the multiple knowledge graphs according to the entity name vector of each of entities of the multiple knowledge graphs;

step 4, constructing a degree-aware-based co-attention network, and calculating an entity similarity between fused entities through the degree-aware-based co-attention network; and step 5, obtaining a high-confidence entity pair according to the entity similarity between the fused entities, and performing knowledge graph completion by iterative training to obtain fused knowledge graphs.

Specifically, the calculating the entity similarity between fused entities through the degree-aware-based co-attention network includes:

step 401, constructing a feature matrix of each of entities of the multiple knowledge graphs, where the feature matrix of each entity is composed of the entity name vector $\vec{N}(e)$ of the entity, the structure vector $\vec{Z}(e)$ of the entity, and an entity degree vector $\vec{g}_e$ of the entity; the entity degree vector $\vec{g}_e$ is expressed as $\vec{g}_e = \vec{M} \cdot \vec{h}_e \in \mathbb{R}^{d_g}$, where $\vec{h}_e$ represents a one-hot vector of a degree of the entity, $\vec{M}$ represents a full connection parameter matrix, and $d_g$ represents a dimension of the entity degree vector; for an entity $e_1$ of the entities of the multiple knowledge graphs, a feature vector thereof is expressed as: $\vec{F}_{e_1} = [\vec{N}(e_1); \vec{Z}(e_1); \vec{g}_{e_1}] \in \mathbb{R}^{3 \times d_m}$, where; represents concatenation along columns, $d_m = \max\{d_n, d_s, d_g\}$, $d_n$ represents a dimension of the entity name vector of the entity $e_1$, and $d_s$ represents a dimension of the structure vector of the entity $e_1$; and step 402, constructing a co-attention similarity matrix $\vec{S} \in \mathbb{R}^{3 \times 3}$ for dynamically depicting a relationship between the feature matrix $\vec{F}_{e_1}$ of the entity $e_1$ and a feature matrix $\vec{F}_{e_2}$ of an entity $e_2$, where a similarity between an i-th feature of the entity $e_1$ and a j-th feature of the entity $e_2$ is expressed as:

$$\vec{S}_{ij} = \alpha\left(\vec{F}_{e_1}^{i:}, \vec{F}_{e_2}^{j:}\right) \in \mathbb{R}, \text{ where } \vec{F}_{e_1}^{i:}$$

represents an i-th row vector of the feature matrix $$\vec{F}_{e_1}, \vec{F}_{e_2}^{j:}$$

represents a j-th row vector of the feature matrix $\vec{F}_{e_2}$, i=1,2,3; j=1,2,3, $\alpha(\vec{u}, \vec{v})=\vec{w}^T(\vec{u} \oplus \vec{v} \oplus (\vec{u} \circ \vec{v}))$ represents a trainable scalar function for generating similarity, $\vec{w} \in \mathbb{R}^{3d_m}$ represents a parameter vector, $\oplus$ represents concatenation along rows, and $\circ$ represents an element-wise multiplication operation;

step 403, generating attention matrices $\overrightarrow{att_1}$ and $\overrightarrow{att_2}$ the co-attention similarity matrix $\vec{S}$, including:

inputting the co-attention similarity matrix $\vec{S}$ into a softmax layer of the degree-aware-based co-attention network and then inputting into an average layer of the degree-aware-based co-attention network, to thereby generate the attention matrices $\overrightarrow{att_1}$ and $\overrightarrow{att_2}$ where the attention matrix $\overrightarrow{att_1}$ represents a correlation degree of a feature of the entity $e_1$ and a feature of the entity $e_2$, $\overrightarrow{att_2}$ represents a correlation degree of the feature of the entity $e_2$ and the feature of the entity $e_1$;

obtaining the entity similarity between the fused entities through multiplying similarities of different features of the fused entities by weights of the similarities of different features of the fused entities respectively, the entity similarity between fused entities is expressed as:

$$\text{Sim}(e_1, e_2) = \text{Sim}_s(e_1, e_2) \cdot \overrightarrow{att_1^s} + \text{Sim}_t(e_1, e_2) \cdot \overrightarrow{att_1^t},$$

where $$\overrightarrow{att_1^s} \text{ and } \overrightarrow{att_1^t}$$

are a first value and a second value of the attention matrix $\overrightarrow{att_1}$, respectively, and represent a weight of the structural similarity $\text{Sim}_s(e_1, e_2)$ and a weight of the entity name similarity $\text{Sim}_t(e_1, e_2)$, respectively.

Specifically, the entity name vector is a power average word vector;

where one entity of the entities of the multiple knowledge graphs has an entity name s, a word vector of words constituting the entity name s is expressed in a matrix form as: $\vec{W}=[\vec{w}_1, \ldots, \vec{w}_l] \in \mathbb{R}^{l \times d}$, where l represents a quantity of the words, and d represents an embedded dimension;

where the power average word vector is generated through performing a power average operation on $\vec{w}_1, \ldots, \vec{w}_l$, where $\vec{w}_1, \ldots, \vec{w}_l \in \mathbb{R}^d$; and the power average operation is expressed by a following formula:

$$H_p(\vec{W}) = \left(\frac{w_{1i}^p + \ldots + w_{li}^p}{l}\right)^{1/p},$$

$\forall i=1, \ldots, d$, $p \in \mathbb{R} \cup \pm\infty$, where $H_p(\vec{W}) \in \mathbb{R}^d$ represents the generated power average word vector after processing $\vec{w}_1, \ldots, \vec{w}_l$.

Further, the entity name vector is a concatenated K-power average word vector, where one entity of the entities of the multiple knowledge graphs has an entity name s, a word vector of words constituting the entity names is expressed in a matrix form as: $\vec{W}=[\vec{w}_1, \ldots, \vec{w}_l] \in \mathbb{R}^{l \times d}$, where l represents a quantity of the words, and d represents an embedded dimension;

where the concatenated K-power average word vector $\vec{n}_s \in \mathbb{R}^{d \times K}$ is obtained by calculating K-power average word vectors of the word vector of the words of the entity name, and then concatenating the K-power average word vectors;

where the concatenated K-power average word vector $\vec{n}_s \in \mathbb{R}^{d \times K}$ is expressed as a following formula: $\vec{n}_s=H_{p_1}(\vec{W}) \oplus \ldots \oplus H_{p_K}(\vec{W})$, where $\oplus$ represents concatenation along rows, and $p_1, \ldots, p_K$ represent K different power mean values.

Further, each of the K different power mean values is one selected from the group consisting of 1, negative infinity and positive infinity.

Specifically, a structural similarity $\text{Sim}_s(e_1, e_2)$ is a cosine similarity between a structure vector $\vec{Z}(e_1)$ of an entity $e_1$ and a structure vector $\vec{Z}(e_2)$ of an entity $e_2$, and an entity name similarity $\text{Sim}_t(e_1, e_2)$ is a cosine similarity between an entity name vector $\vec{N}(e_1)$ of the entity $e_1$ and an entity name vector $\vec{N}(e_2)$ of the entity $e_2$. In an embodiment of the present disclosure, the obtaining the high-confidence entity pair according to the entity similarity between the fused entities includes:

assuming that, for each entity $e_1$ in an original knowledge graph, an entity $e_2$ in an external knowledge graph has a most similarity with the entity $e_1$, an entity $e_2'$ in the external knowledge has a second most similarity with the entity $e_1$, and a similarity difference therebetween is $$\Delta_1 \triangleq \text{Sim}(e_1, e_2) - \text{Sim}(e_1, e_2');$$

and for the entity $e_2$ in the external knowledge graph, the entity $e_1$ in the original knowledge graph has a most similarity with the entity $e_2$, the entity $e_1'$ in the original knowledge graph has a second most similarity with the entity $e_2$, and a similarity difference therebetween is $$\Delta_2 \triangleq \text{Sim}(e_2, e_1) - \text{Sim}(e_2, e_1'),$$

and determining $(e_1, e_2)$ as the high-confidence entity pair, if the similarity differences $\Delta_1, \Delta_2$ are each higher than a preset value;

where the iterative training of the knowledge graph completion includes multiple rounds; during the iterative training, for each triplet in the external knowledge graph, if a head entity of the triplet and a tail entity of the triplet are in the original knowledge graph, an entity in the external knowledge graph is replaced with a corresponding entity in the original knowledge graph and added to the original knowledge graph to obtain a knowledge graph after adding; and the knowledge graph after adding is used to: re-perform the structure vector representation learning, re-calculate the entity similarity, generate a new high-confidence entity pair, and re-perform the knowledge graph completion, and the iterative training is stopped until a stop condition is satisfied.

Compared with the related art, the present disclosure has at least the following advantages and beneficial effects.

Firstly, a degree-aware-based co-attention network is proposed to fuse entity name information and structure information, so that the alignment effect is better;

Secondly, a concatenated power-average word vector is proposed and used to represent an entity name. Compared with an average word vector, the concatenated power-average word vector can capture more information about entity names and reduce the uncertainty of vector representation;

Thirdly, an iterative training algorithm based on knowledge graph completion is proposed, which can improve the entity alignment effect iteratively while supplementing the structure information of knowledge graph, making it easier for long-tail entities to align.

BRIEF DESCRIPTION OF THE DRAWINGS

FIG. 1 illustrates an overall flowchart of a knowledge graph fusion method based on iterative completion according to an embodiment of the present disclosure.

DETAILED DESCRIPTION OF EMBODIMENTS

Figure 2:
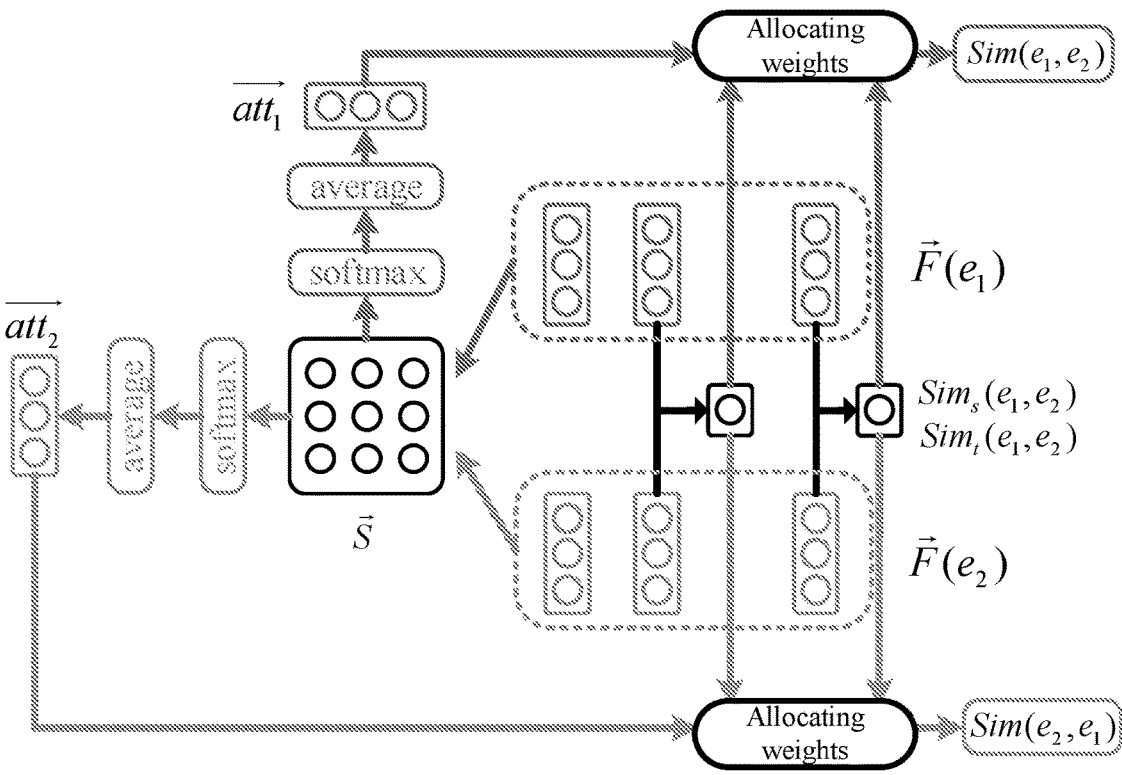
FIG. 2 illustrates a schematic structural view of a degree-aware-based co-attention network according to an embodiment of the present disclosure.

The present disclosure will be further explained below combined with accompanying drawings, but it will not be limited in any way. Any change or substitution made based on the teaching of the present disclosure belong to the scope of protection of the present disclosure.

As shown in FIG. 1, a knowledge graph fusion method based on iterative completion includes:

step 1, obtaining multiple knowledge graphs, and identifying each of entities of the multiple knowledge graphs;

step 2, performing structure vector representation learning on each of entities of the multiple knowledge graphs to obtain a structure vector of each of entities of the multiple knowledge graphs, and performing entity name vector representation learning on each of entities of the multiple knowledge graphs to obtain an entity name vector of each of entities of the multiple knowledge graphs;

step 3, determining a structural similarity between the entities of the multiple knowledge graphs according to the structure vector of each of entities of the multiple knowledge graphs, and determining an entity name similarity between the entities of the multiple knowledge graphs according to the entity name vector of each of entities of the multiple knowledge graphs;

step 4, constructing a degree-aware-based co-attention network, and calculating an entity similarity between fused entities through the degree-aware-based co-attention network;

step 5, obtaining a high-confidence entity pair according to the entity similarity between the fused entities, and performing knowledge graph completion by iterative training to obtain fused knowledge graphs.

The structure vector representation learning can adopt the existing methods in the "DESCRIPTION OF RELATED ART" to generate the structure vector, the structure vector is expressed as $\vec{Z} \in \mathbb{R}^{n \times d_s}$, where n represents a quantity of entities, and $d_s$ represents a dimension of the structure vector.

For two given entities $e_1$ and $e_2$, a structural similarity $\text{Sim}_s(e_1, e_2)$ between them is a cosine similarity between a structure vector $\vec{Z}(e_1)$ of the entity $e_1$ and a structure vector $\vec{Z}(e_2)$ of the entity $e_2$.

The entity name vector may adopt a power average word vector. For an entity with an entity name s, a word vector of words constituting the entity name is expressed in a matrix form as $\vec{W} = [\vec{w}_1, \ldots, \vec{w}_l] \in \mathbb{R}^{l \times d}$, where l represents a quantity of the words, and d represents an embedded dimension. The power average word vector can be generated through performing a power average operation on $\vec{w}_1, \ldots, \vec{w}_l$, where $\vec{w}_1, \ldots, \vec{w}_l \in \mathbb{R}^d$. The power average operation is expressed by a following formula:

$$H_p(\vec{W}) = \left( \frac{w_{1i}^p + \ldots + w_{li}^p}{l} \right)^{1/p},$$

$\forall i = 1, \ldots, d, p \in \mathbb{R} \cup \pm\infty$, where $H_p(\vec{W}) \in \mathbb{R}^d$ represents the generated power average word vector, which is obtained through processing $\vec{w}_1, \ldots, \vec{w}_l$.

Furthermore, in order to capture more features of the entity name, the entity name vector can be a concatenated K-power average word vector, which is obtained by: calculating K-power average word vectors of the word vector of the words of the entity name, and then concatenating the K-power average word vectors to generate the concatenated K-power average word vector $n_s \in \mathbb{R}^{d \times K}$. The concatenated K-power average word vector is expressed as a following formula: $\vec{n}_s = H_{p_1}(\vec{W}) \oplus \ldots \oplus H_{p_K}(\vec{W})$, where $\oplus$ represents concatenation along rows, and $p_1, \ldots, p_K$ represent K different power mean values. In this embodiment, each of the K different power mean values is one selected from the group consisting of 1, negative infinity and positive infinity.

All of the entity name vectors are represented as a matrix $\vec{N} \in \mathbb{R}^{n \times d_n}$, where $d_n = d \times K$ represents a dimension of the entity name vector. For two given entities $e_1$ and $e_2$, an entity name similarity $\text{Sim}_t(e_1, e_2)$ between them is a cosine similarity between an entity name vector $\vec{N}(e_1)$ of the entity $e_1$ and an entity name vector $\vec{N}(e_2)$ of the entity $e_2$.

Compared with the average word vector, the concatenated power average word vector can capture more information of the entity name and reduce the uncertainty of vector representation.

Different information can depict an entity from different aspects. Therefore, it is required to effectively combine various information through feature fusion. For entities with different degrees, the importance of all kinds of information is different. For long-tail entities with only a little structure information, entity name information is more important; while for common entities, the structure information is more important. To describe this dynamic change, a degree-aware-based co-attention network is designed, as shown in FIG. 2.

Inputs of the degree-aware-based co-attention network are the structural similarity $Sim_s(e_1, e_2)$ between the two entities, the entity name similarity $Sim_t(e_1, e_2)$ of the two entities, and degrees of the two entities. The calculating entity similarity between fused entities through the degree-aware-based co-attention network includes steps 401, 402, and 403.

In step 401, a feature matrix of each of entities of the multiple knowledge graphs is constructed, where the feature matrix of each entity is composed of the entity name vector $\vec{N}(e)$ of the entity, the structure vector $\vec{Z}(e)$ of the entity, and an entity degree vector $\vec{g}_e$ of the entity, the entity degree vector $\vec{g}_e$ is expressed as $\vec{g}_e = \vec{M} \cdot \vec{h}_e \in \mathbb{R}^{d_g}$, where $\vec{h}_e$ represents a one-hot vector of a degree of the entity, $\vec{M}$ represents a full connection parameter matrix, and $d_g$ represents a dimension of the entity degree vector. For the entity $e_1$, a feature vector thereof is expressed as: $\vec{F}_{e_1} = [\vec{N}(e_1); \vec{Z}(e_1); \vec{g}_{e_1}] \in \mathbb{R}^{3 \times d_m}$, where; represents concatenation along columns, and $d_m = \max\{d_n, d_s, d_g\}$.

In step 402, for dynamically depicting a relationship between the feature matrix $\vec{F}_{e_1}$ of the entity $e_1$ and the feature matrix $\vec{F}_{e_2}$ of the entity $e_2$, a co-attention similarity matrix $\vec{S} \in \mathbb{R}^{3 \times 3}$ is constructed. A similarity between an i-th feature of the entity $e_1$ and a j-th feature of the entity $e_2$ is expressed as:

$$\vec{S}_{ij} = \alpha\left(\vec{F}_{e_1}^{i:}, \vec{F}_{e_2}^{j:}\right) \in \mathbb{R}, \text{ where } \vec{F}_{e_1}^{i:}$$

represents an i-th row vector of the feature matrix $$\vec{F}_{e_1}, \vec{F}_{e_2}^{j:}$$

represents a j-th row vector of the feature matrix $\vec{F}_{e_2}$, i=1,2,3; j=1,2,3; $\alpha(\vec{u}, \vec{v}) = \vec{w}^T(\vec{u} \oplus \vec{v} \oplus (\vec{u} \circ \vec{v}))$ represents a trainable scalar function for generating similarity, $\vec{w} \in \mathbb{R}^{3 d_m}$ represents a parameter vector, $\oplus$ represents concatenation along rows, and represents an element-wise multiplication operation.

In step 403, attention matrices $\overrightarrow{att}_1$ and $\overrightarrow{att}_2$ are generated using the co-attention similarity matrix $\vec{S}$. Specifically, the co-attention similarity matrix $\vec{S}$ is first input into a softmax layer of the degree-aware-based co-attention network and then input into an average layer of the degree-aware-based co-attention network, to thereby generate the attention matrices $\overrightarrow{att}_1$ and $\overrightarrow{att}_2$, where the attention matrix $\overrightarrow{att}_1$ represents a correlation degree of a feature of the entity $e_1$ and a feature of the entity $e_2$, the attention matrix $\overrightarrow{att}_2$ represents a correlation degree of the feature of the entity $e_2$ and the feature of the entity $e_1$. Further, by multiplying similarities of different features by weights of the similarities of different features, the entity similarity between the fused entities are obtained and expressed as:

$$Sim(e_1, e_2) = Sim_s(e_1, e_2) \cdot \overrightarrow{att}_1^s + Sim_t(e_1, e_2) \cdot \overrightarrow{att}_1^t,$$

where $$\overrightarrow{att}_1^s \text{ and } \overrightarrow{att}_1^t$$

are a first value and a second value of the attention matrix $\overrightarrow{att}_1$, respectively, and represent a weight of the structural similarity $Sim_s(e_1, e_2)$ and a weight of the entity name similarity $Sim_t(e_1, e_2)$, respectively.

It should be noted that $Sim(e_1, e_2) \neq Sim(e_2, e_1)$. After the degree-aware-based co-attention network is trained to obtain the entity similarities by maximizing differences between of positive and negative proportional similarities, for each to-be-aligned entity, an entity in an external knowledge graph with a greatest similarity with the to-be-aligned entity can be selected as a corresponding entity to achieve entity alignment.

A long-tail entity may have little structure information in an original knowledge graph, but has rich structure information in the external knowledge graph. If the structure information in the external knowledge graph can be introduced to supplement the structure information of the long-tail entity in the original knowledge graph, the long-tail problem can be improved to some extent and the coverage of the knowledge graph can be improved. The improved knowledge graph can generate more accurate structure vectors and improve the effect of entity alignment.

The obtaining the high-confidence entity pair according to the entity similarity between the fused entities includes: assuming that, for each entity $e_1$ in an original knowledge graph, an entity $e_2$ in an external knowledge graph has a most similarity with the entity $e_1$, an entity $e_2'$ in the external knowledge has a second most similarity with the entity $e_1$, and a similarity difference therebetween is $$\Delta_1 \triangleq Sim(e_1, e_2) - Sim(e_1, e_2');$$

and for the entity $e_2$ in the external knowledge graph, the entity $e_1$ in the original knowledge graph has a most similarity with the entity $e_2$, the entity $e_1'$ in the original knowledge graph has a second most similarity with the entity $e_2$, and a similarity difference therebetween is $$\Delta_2 \triangleq Sim(e_2, e_1) - Sim(e_2, e_1'),$$

9 and determining $(e_1, e_2)$ as the high-confidence entity pair, if the similarity differences $\Delta_1$, $\Delta_2$ are each higher than a preset value.

The iterative training of the knowledge graph completion includes multiple rounds. For each triplet in the external knowledge graph, if a head entity of the triplet and a tail entity of the triplet are in the original knowledge graph, an entity in the external knowledge graph is replaced with a corresponding entity in the original knowledge graph and added to the original knowledge graph to obtain a knowledge graph after adding; Then, the knowledge graph after adding is used to re-perform the structure vector representation learning, re-calculate the entity similarity, generate a new high-confidence entity pair, and re-perform the knowledge graph completion, and the iterative training is stopped until a stop condition is satisfied.

Figure 3:
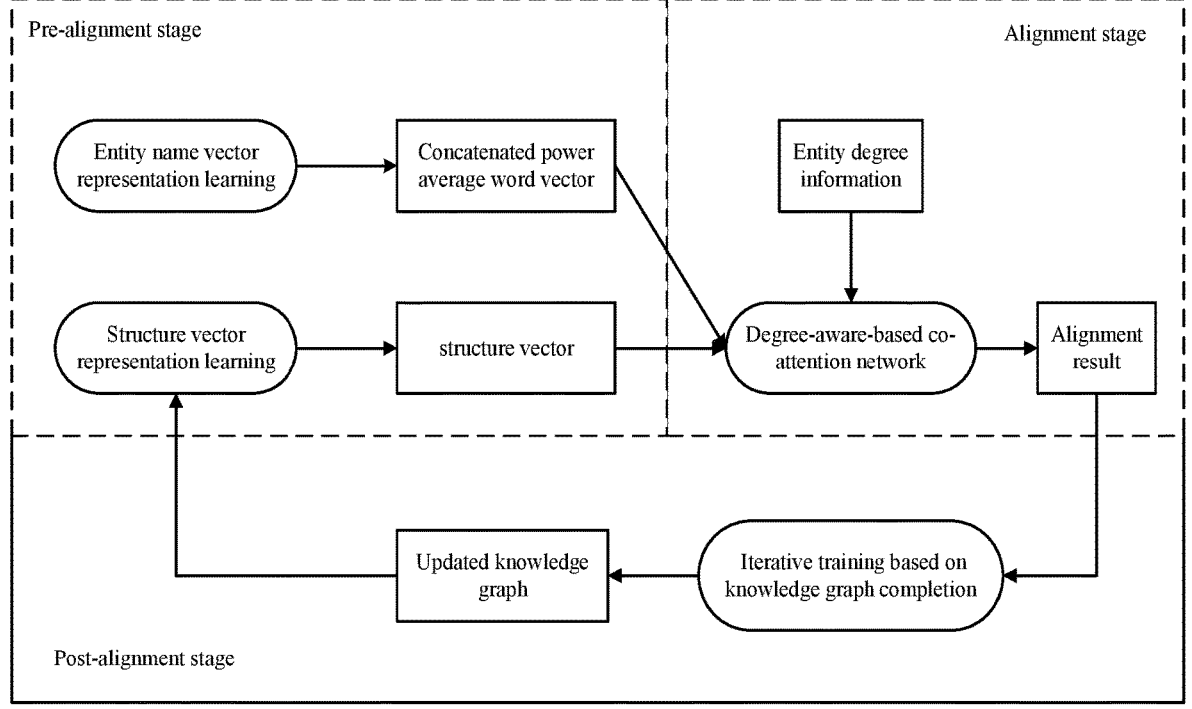
FIG. 3 illustrates an overall flow frame view of a knowledge graph fusion method based on iterative completion according to an embodiment of the present disclosure.

It can be known from "SUMMARY" and "DETAILED DESCRIPTION OF EMBODIMENTS" that, in order to solve the problem of entity alignment under the condition of insufficient structure information, the method of the present disclosure proposes a new entity alignment framework as shown in FIG. 3, thereby better realizing the fusion of knowledge graphs. The main technical effects of the present disclosure are as follows.

In a pre-alignment stage, the method of the present disclosure takes the entity name as new alignment information. In the related art, the entity name vector, as an initial feature, is used to learn entity alignment work indicated by a structure, in contrast, the method of the present disclosure takes the entity name as a separate feature and the entity name is represented by a concatenated power average word vector, which can capture more information of the entity name and reduce the uncertainty of the vector representation. In an alignment stage, it is observed that the importance of structure information and entity name information is different for entities with different degrees, as such, a degree-aware-based co-attention network is designed to determine weights of different features under the guidance of degrees, and effectively fuse multi-source information. In a post-alignment stage, an iterative training algorithm based on knowledge graph completion is proposed, which can improve the entity alignment effect iteratively while supplementing the structure information of the knowledge graph, thereby making the long-tail entities easier to align.

It should be noted that, the knowledge graph fusion method based on iterative completion can be implemented by a knowledge graph fusion device based on iterative completion, including a processor and a memory, the memory is configured to store a computer program; and the processor is configured to execute the computer program stored in the memory to carry out the knowledge graph fusion method based on iterative completion.

The above-mentioned embodiments are embodiments of the method of the present disclosure for knowledge graph fusion, but the embodiments of the present disclosure is not limited by the above-mentioned embodiments. Any other changes, modifications, substitutions, combinations and simplifications that deviate from the spirit and principle of the present disclosure should be equivalent replacement methods, which are included in the scope of protection of the present disclosure.

What is claimed is:

1. A knowledge graph fusion method based on iterative completion, executed by a processor and comprising:

step 1, obtaining a plurality of knowledge graphs, and identifying each of entities of the plurality of knowledge graphs;

step 2, performing structure vector representation learning on each of entities of the plurality of knowledge graphs to obtain a structure vector of each of entities of the plurality of knowledge graphs, and performing entity name vector representation learning on each of entities of the plurality of knowledge graphs to obtain an entity name vector of each of entities of the plurality of knowledge graphs;

step 3, determining a structural similarity between the entities of the plurality of knowledge graphs according to the structure vector of each of entities of the plurality of knowledge graphs, and determining an entity name similarity between the entities of the plurality of knowledge graphs according to the entity name vector of each of entities of the plurality of knowledge graphs;

step 4, constructing a degree-aware-based co-attention network, and calculating an entity similarity between fused entities through the degree-aware-based co-attention network; wherein the calculating the entity similarity between fused entities through the degree-aware-based co-attention network comprises:

step 401, constructing a feature matrix of each of entities of the multiple knowledge graphs, where the feature matrix of each entity is composed of the entity name vector $\vec{N}(e)$ of the entity, the structure vector $\vec{Z}(e)$ of the entity, and an entity degree vector $\vec{g}_e$ of the entity; the entity degree vector $\vec{g}_e$ is expressed as $$\vec{g}_e = \vec{M} \cdot \vec{h}_e \in \mathbb{R}^{d_g},$$

where $\vec{h}_e$ represents a one-hot vector of a degree of the entity, $\vec{M}$ represents a full connection parameter matrix, and $d_g$ represents a dimension of the entity degree vector; for an entity $e_1$ of the entities of the plurality of knowledge graphs, a feature vector thereof is expressed as:

$$\vec{F}_{e_1} = \left[\vec{N}(e_1); \vec{Z}(e_1); \cdot \vec{g}_{e_1}\right] \in \mathbb{R}^{3 \times d_m},$$

where; represents concatenation along columns, $d_m = \max\{d_n, d_s, d_g\}$, $d_n$ represents a dimension of the entity name vector of the entity $e_1$, and $d_s$ represents a dimension of the structure vector of the entity $e_1$; and step 402, constructing a co-attention similarity matrix $S \in \mathbb{R}^{3 \times 3}$ for dynamically depicting a relationship between the feature matrix $\vec{F}_e$ of the entity $e_1$ and a feature matrix $\vec{F}_{e_2}$ of an entity $e_2$, wherein a similarity between an i-th feature of the entity $e_1$ and a j-th feature of the entity $e_2$ is expressed as:

$$\vec{S}_{ij} = \alpha\left(\vec{F}_{e_1}^{i:}, \vec{F}_{e_2}^{j:}\right) \in \mathbb{R},$$

where $$\vec{F}_{e_1}^{i:}$$

11 represents an i-th row vector of the feature matrix $$\vec{F}_{e_1}, \vec{F}_{e_2}^{j:}$$

represents a j-th row vector of the feature matrix $\vec{F}_{e_2}$, i=1,2,3; j=1,2,3, $\alpha(\vec{u}, \vec{v})=\vec{w}^T(\vec{u} \oplus \vec{v} \oplus (\vec{u} \circ \vec{v}))$ represents a trainable scalar function for generating similarity, $\vec{w} \in {}^{3d_m}$ represents a parameter vector, $\oplus$ represents concatenation along rows, and $\circ$ represents an element-wise multiplication operation; and step 403, generating attention matrices $\overrightarrow{att}_1$ and $\overrightarrow{att}_2$ using the co-attention similarity matrix $\vec{S}$, comprising:

inputting the co-attention similarity matrix $\vec{S}$ into a softmax layer of the degree-aware-based co-attention network and then inputting into an average layer of the degree-aware-based co-attention network, to thereby generate the attention matrices $\overrightarrow{att}_1$ and $\overrightarrow{att}_2$, wherein the attention matrix $\overrightarrow{att}_1$ represents a correlation degree of a feature of the entity $e_1$ and a feature of the entity $e_2$, $\overrightarrow{att}_2$ represents a correlation degree of the feature of the entity $e_2$ and the feature of the entity $e_1$;

obtaining the entity similarity between the fused entities through multiplying similarities of different features of the fused entities by weights of the similarities of different features of the fused entities respectively, the entity similarity between fused entities is expressed as:

$$Sim(e_1, e_2) = Sim_s(e_1, e_2) \cdot \overrightarrow{att}_1^s + Sim_t(e_1, e_2) \cdot \overrightarrow{att}_1^t,$$

where $$\overrightarrow{att}_1^s \text{ and } \overrightarrow{att}_1^t$$

are a first value and a second value of the attention matrix $\overrightarrow{att}_1$, respectively, and represent a weight of the structural similarity $Sim_s(e_1, e_2)$ and a weight of the entity name similarity $Sim_t(e_1, e_2)$, respectively;

step 5, obtaining a high-confidence entity pair according to the entity similarity between the fused entities, and performing knowledge graph completion by iterative training to obtain fused knowledge graphs; and step 6, deploying the fused knowledge graphs to a question answering system, wherein the question answering system is configured to utilize knowledge in the fused knowledge graphs to generate responses to user queries.

2. The knowledge graph fusion method based on iterative completion according to claim 1, wherein the entity name vector is a power average word vector;

wherein one entity of the entities of the plurality of knowledge graphs has an entity name s, a word vector of words constituting the entity name s is expressed in a matrix form as: $\vec{W}=[\vec{w}_1, \ldots, \vec{w}_l] \in {}^{l \times d}$, where l represents a quantity of the words, and d represents an embedded dimension;

wherein the power average word vector is generated through performing a power average operation on $\vec{w}_1, \ldots, \vec{w}_l$, where $\vec{w}_1, \ldots, \vec{w}_l \in {}^d$; and the power average operation is expressed by a following formula:

$$H_p(\vec{W}) = \left( \frac{w_{1i}^p + \ldots + w_{li}^p}{l} \right)^{1/p},$$

$\forall i=1, \ldots, d, p \in \cup \pm \infty$, where $H_p(\vec{W}) \in {}^d$ represents the generated power average word vector after processing $\vec{w}_1, \ldots, \vec{w}_l$.

3. The knowledge graph fusion method based on iterative completion according to claim 1, wherein the entity name vector is a concatenated K-power average word vector, wherein one entity of the entities of the plurality of knowledge graphs has an entity name s, a word vector of words constituting the entity name s is expressed in a matrix form as: $\vec{W}=[\vec{w}_1, \ldots, \vec{w}_l] \in {}^{l \times d}$, where l represents a quantity of the words, and d represents an embedded dimension;

wherein the concatenated K-power average word vector $\vec{n}_s \in {}^{d \times K}$ is obtained by calculating K-power average word vectors of the word vector of the words of the entity name, and then concatenating the K-power average word vectors;

wherein the concatenated K-power average word vector $\vec{n}_s \in {}^{d \times K}$ is expressed as a following formula: $\vec{n}_s = H_{p_1}(\vec{W}) \oplus \ldots \oplus H_{p_K}(W)$, where $\oplus$ represents concatenation along rows, and $p_1, \ldots, p_K$ represent K different power mean values.

4. The knowledge graph fusion method based on iterative completion according to claim 3, wherein each of the K different power mean values is one selected from the group consisting of 1, negative infinity and positive infinity.

5. The knowledge graph fusion method based on iterative completion according to claim 1, wherein the structural similarity $Sim_s(e_1, e_2)$ is a cosine similarity between the structure vector $\vec{Z}(e_1)$ of the entity $e_1$ and the structure vector $\vec{Z}(e_2)$ of the entity $e_2$, and the entity name similarity $Sim_t(e_1, e_2)$ is a cosine similarity between the entity name vector $\vec{N}(e_1)$ of the entity $e_1$ and the entity name vector $\vec{N}(e_2)$ of the entity $e_2$.

6. The knowledge graph fusion method based on iterative completion according to claim 1, wherein the obtaining the high-confidence entity pair according to the entity similarity between the fused entities comprises:

assuming that, for the entity $e_1$ in an original knowledge graph, the entity $e_2$ in an external knowledge graph has a most similarity with the entity $e_1$, an entity in the external $$e_2'$$

in the external knowledge has a second most similarity with the entity $e_1$, and a similarity difference therebetween is $$\Delta_1 \triangleq Sim(e_1, e_2) - Sim(e_1, e_2');$$

and for the entity $e_2$ in the external knowledge graph, the entity $e_1$ in the original knowledge graph has a most similarity with the entity $e_2$, the entity $$e_1'$$

in the original knowledge graph has a second most similarity with the entity $e_2$, and a similarity difference therebetween is $$\Delta_2 \triangleq Sim(e_2,\ e_1) - Sim(e_2,\ e_1'),$$

and determining $(e_1, e_2)$ as the high-confidence entity pair, if the similarity differences $\Delta_1$ and $\Delta_2$ are each higher than a preset value;

wherein the iterative training of the knowledge graph completion comprises a plurality of rounds; during the iterative training, for each triplet in the external knowledge graph, if a head entity of the triplet and a tail entity of the triplet are in the original knowledge graph, an entity in the external knowledge graph is replaced with a corresponding entity in the original knowledge graph and added to the original knowledge graph to obtain a knowledge graph after adding; and the knowledge graph after adding is used to: re-perform the structure vector representation learning, re-calculate the entity similarity, generate a new high-confidence entity pair, and re-perform the knowledge graph completion, and the iterative training is stopped until a stop condition is satisfied.

7. A knowledge graph fusion method based on iterative completion, executed by a processor and comprising:

step 1, obtaining a plurality of knowledge graphs, and identifying each of entities of the plurality of knowledge graphs;

step 2, performing structure vector representation learning on each of entities of the plurality of knowledge graphs to obtain a structure vector of each of entities of the plurality of knowledge graphs, and performing entity name vector representation learning on each of entities of the plurality of knowledge graphs to obtain an entity name vector of each of entities of the plurality of knowledge graphs;

step 3, determining a structural similarity between the entities of the plurality of knowledge graphs according to the structure vector of each of entities of the plurality of knowledge graphs, and determining an entity name similarity between the entities of the plurality of knowledge graphs according to the entity name vector of each of entities of the plurality of knowledge graphs;

step 4, constructing a degree-aware-based co-attention network, and calculating an entity similarity between fused entities through the degree-aware-based co-attention network;

step 5, obtaining a high-confidence entity pair according to the entity similarity between the fused entities, and performing knowledge graph completion by iterative training to obtain fused knowledge graphs; and step 6, integrating the fused knowledge graphs into a question answering system by storing the fused knowledge graphs in a knowledge base storage accessible to the question answering system, and configuring the question answering system to query the fused knowledge graphs to generate responses to user queries;

wherein the obtaining the high-confidence entity pair according to the entity similarity between the fused entities comprises:

assuming that, for each entity $e_1$ in an original knowledge graph, an entity $e_2$ in an external knowledge graph has a most similarity with the entity $e_1$, an entity $$e_2'$$

in the external knowledge has a second most similarity with the entity $e_1$, and a similarity difference therebetween is $$\Delta_1 \triangleq Sim(e_1, e_2) - Sim(e_1, e_2');$$

and for the entity $e_2$ in the external knowledge graph, the entity $e_1$ in the original knowledge graph has a most similarity with the entity $e_2$, the entity $$e_1'$$

in the original knowledge graph has a second most similarity with the entity $e_2$, and a similarity difference therebetween is $$\Delta_2 \triangleq Sim(e_2, e_1) - Sim(e_2, e_1'),$$

and determining $(e_1, e_2)$ as the high-confidence entity pair, if the similarity differences $\Delta_1$, $\Delta_2$ are each higher than a preset value; and wherein the iterative training of the knowledge graph completion comprises a plurality of rounds; during the iterative training, for each triplet in the external knowledge graph, if a head entity of the triplet and a tail entity of the triplet are in the original knowledge graph, an entity in the external knowledge graph is replaced with a corresponding entity in the original knowledge graph and added to the original knowledge graph to obtain a knowledge graph after adding; and the knowledge graph after adding is used to: re-perform the structure vector representation learning, re-calculate the entity similarity, generate a new high-confidence entity pair, and re-perform the knowledge graph completion, and the iterative training is stopped until a stop condition is satisfied.

* * * * *